Figure 1:
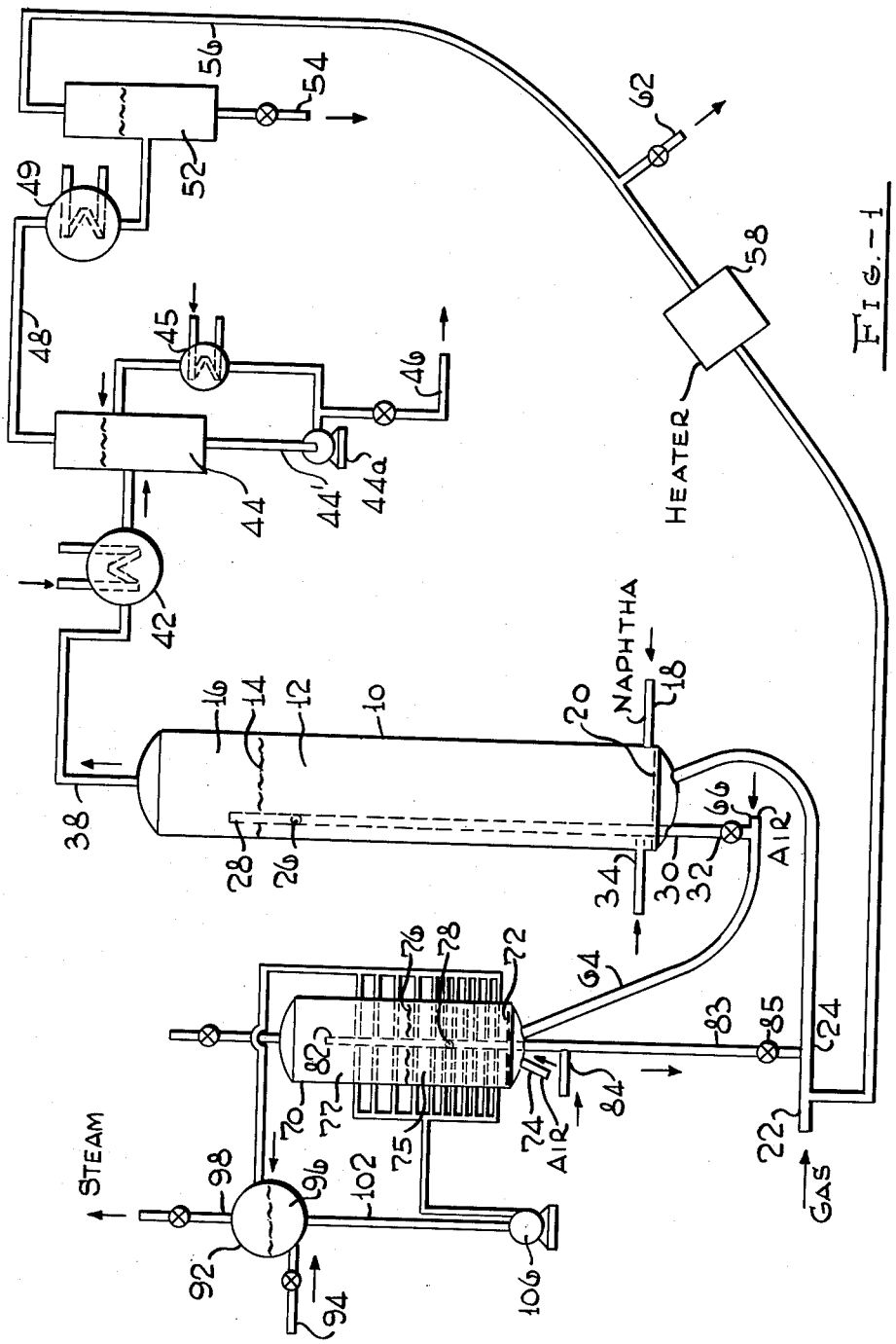

Feb. 21, 1956

W. A. REX 2,735,744

METHOD OF AND APPARATUS FOR CONTROLLING
REGENERATOR TEMPERATURES

Original Filed Oct. 27, 1950

2 Sheets-Sheet 1

Walter A. Rex  Inventor

By George J Silhavy  Attorney

Walter A. Rex Inventor

United States Patent Office 2,735,744
Patented Feb. 21, 1956

2,735,744

METHOD OF AND APPARATUS FOR CONTROLLING REGENERATOR TEMPERATURES

Walter A. Rex, deceased, late of Westfield, N. J., by Virginia C. Rex, administratrix, Westfield, N. J.; said Walter A. Rex assignor to Esso Research and Engineering Company, a corporation of Delaware Continuation of application Serial No. 192,471, October 27, 1950. This application December 23, 1954, Serial No. 477,434

5 Claims. (Cl. 23—1)

This is a continuation of copending application Serial No. 192,471, filed October 27, 1950, and now abandoned, by Walter A. Rex for "Method of and Apparatus for Controlling Regenerator Temperatures."

This invention relates to a method and apparatus for controlling temperature during exothermic reactions in the presence of finely divided solids and more particularly relates to the regeneration of catalyst particles used for catalytic reactions.

In a copending application Serial No. 289,121, now abandoned, there is disclosed and claimed a method of regenerating temperature control by varying the cooling surface in the dense bed with no variation in catalyst recirculation rate.

The invention is especially adapted for use in fluid hydroforming. In this process when operating under optimum conditions, it is necessary to remove substantial quantities of heat from the regeneration zone because the amount of heat that is carried back to the reaction zone with the circulating catalyst is only a fraction of the heat released in the regenerator. In accordance with the invention, the amount of heat that is removed, and consequently, the regenerator temperature is controlled by raising and lowering the catalyst level in the regenerator. In the preferred fluid hydroforming design, the regeneration zone is much smaller than the reaction zone and the catalyst hold-up or residence time in the regeneration zone is much smaller than that in the reaction zone. The level of the fluidized catalyst undergoing regeneration can therefore be changed with only negligible effect on the catalyst hold-up in the reaction zone.

The regeneration zone is provided with a plurality of coils which are in indirect heat exchange with the catalyst undergoing regeneration and through which a cooling medium is circulated. The heat exchange coils are ordinarily not all submerged in the fluidized bed of catalyst undergoing regeneration. Some of the heat exchange coils are so arranged that they are always submerged in the lower part of the fluidized bed of catalyst undergoing regeneration and these heat exchange coils or tubes take out a fixed amount of heat at all times from the regeneration zone. The rest of the heat exchange coils or tubes are arranged to normally be above the dense fluidized bed of catalyst and are thus contacted only by the hot regeneration gases and a small amount of catalyst suspended therein as regeneration gases pass upwardly through the outlet of the regeneration zone. Normally the lower heat exchange coils or tubes will be submerged in the fluidized bed but if it is desired to remove more heat from the regeneration zone for any reason the level of the fluid bed in the regeneration zone is raised to submerge additional heat exchange coils or tubes. The upper coils or tubes are preferably spaced apart a greater distance than the lower coil or tubes in order that minor surges in regenerator level will not affect heat removal.

The heat exchange coils or tubes are used to generate high pressure steam and in the operation of this invention all the coils would be wet tubes which means that the inside of the heat exchange coils or tubes must contain a liquid film of water to avoid dry sections of tubes which would become quickly overheated. The coefficient of heat transfer is much greater where the tubes are submerged in the dense fluidized bed so that more heat is taken out from the tubes which are in indirect heat exchange with the dense fluidized bed. The upper heat exchange coils or tubes are exposed to gases containing only a small amount of catalyst in the dilute phase in normal operation and the coefficient of heat transfer is much lower than that in the dense phase. By increasing the level of the fluid bed in the regeneration zone more of the heat exchange coils or tubes are contacted with the dense fluidized bed and a greater amount of heat removed from the regeneration zone. Where the regeneration zone has a lower temperature than desired, the level of the fluidized bed of catalyst undergoing regeneration is lowered so that less heat is removed by the heat exchange coils or tubes.

Figure 2:
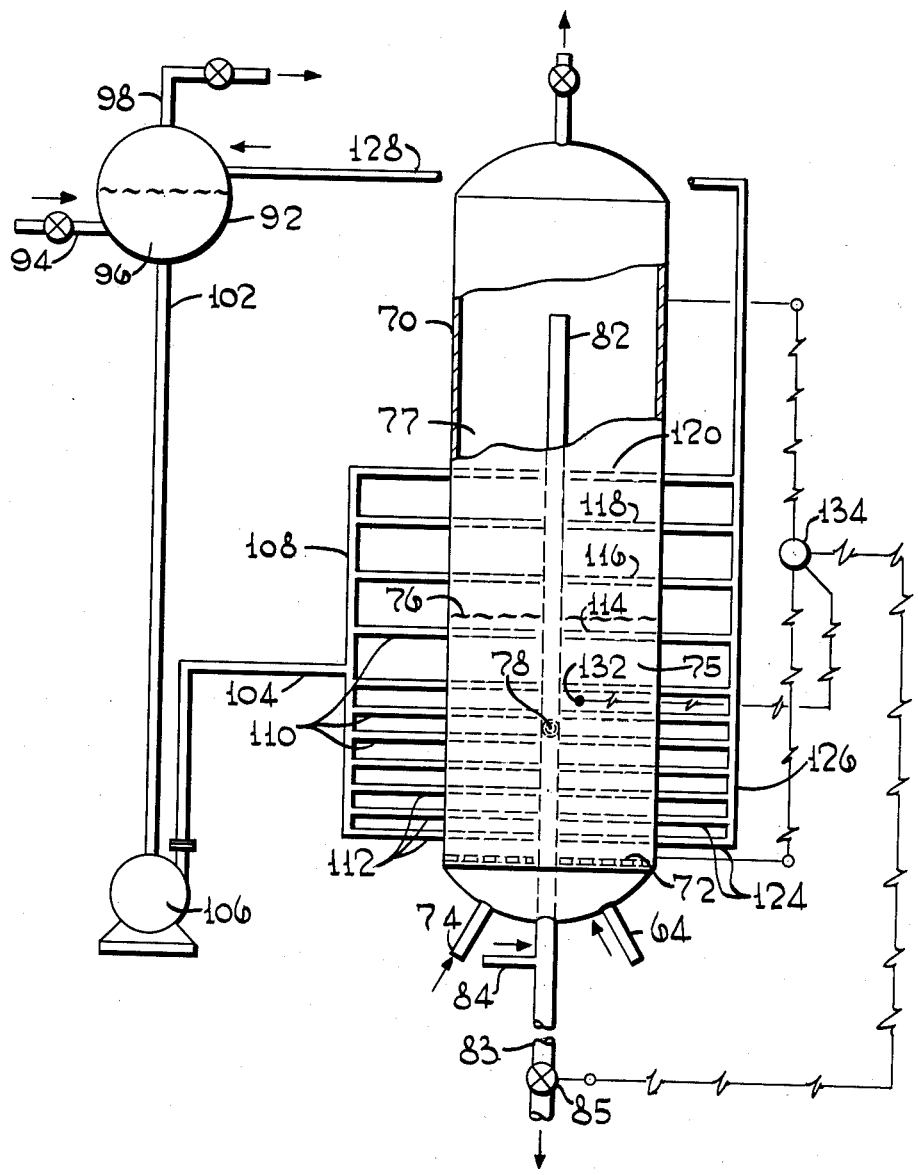

In the drawings:

Fig. 1 represents a diagrammatic showing of one form of apparatus for carrying out the present invention; and Fig. 2 is an enlarged view of the regeneration zone showing one particular arrangement of heat exchange coils or tubes therein.

The invention will be first generally described in connection with Fig. 1 and then will be described in greater detail in connection with Fig. 2. The reference character 10 designated a reaction zone adapted to hold a large amount of finely divided catalyst as a dense fluidized bed 12 having a level indicated at 14. The upward passage of gas and vapor through the reaction zone 10 maintains the catalyst particles as a dense turbulent liquid-simulating bed having a dilute phase which comprises a light suspension of catalyst particles in gas and vapor above the dense bed as indicated at 16.

The catalyst is any suitable hydroforming catalyst and may be an alumina-molybdenum oxide catalyst or may be other group VI oxides supported on alumina or zinc spinel as a carrier or other suitable carrier. The catalyst is preferably finely divided having particles between 200 and 400 mesh in size and having particles sizes between 0 and 200 microns in diameter with a major proportion being between about 20 and 100 microns.

The hydrocarbon feed is preferably a virgin naphtha but may also be a cracked naphtha from thermal or catalytic processes or may be naphtha which has been synthetically prepared. The boiling range of the naphtha may be between about 175° F. and 450° F., preferably in the range between about 200° F. and 350° F. The naphtha feed heated to about 800° F. to 1000° F., preferably 950° F. is passed through line 18 into the lower portion of the fluidized bed 12 in the reaction zone 10 above a perforated grid member 20 which functions to distribute the gases and solid particles across the area of the reaction zone 10. Preferably, the line 18 is provided at its inner end within the reaction zone 10 with distributing pipes or nozzles to introduce the hot naphtha as a plurality of streams into the bottom of fluidized bed 12. The reaction zone is maintained at a temperature in the range between about 850° F. and 925° F., preferably 900° F. Gases containing about 50–70% hydrogen, which may be a gas made in the process, is heated to about 1150° to 1200° F., preferably about 1185° F. and is passed through line 22 into line 24 where it contacts and picks up hot regenerated catalyst at about 1150° F. and forms a dilute suspension of catalyst particles in gas. This suspension is passed through line 24 and introduced into the bottom of reaction zone 10 below grid 20 for distributing the catalyst and gas across the area of the reaction zone.

The pressure in the reaction zone is maintained between about 100 and 500 lbs. per square inch gage, preferably about 200 lbs. per square inch gage. The space velocity which is defined as pounds of feed per hour per pound of catalyst in the reaction zone is in the range between about 1.5 and 0.15 depending on the catalyst activity, the desired octane number and the characteristics of the feed. The catalyst to oil ratio by weight is in the range between about 0.5 to 3, but is preferably about 1.

The superficial velocity of the upflowing gasiform material in the reaction zone is in the range between about 0.2 feet and 0.9 feet per second, depending upon the pressure, preferably below 0.6 foot per second, at a pressure of about 200 to 250 lbs. per square inch. In the reaction zone, the flow of catalyst and gasiform material comprising naphtha and hydrogen-containing gas is generally concurrent and the catalyst is removed from the upper portion of the reaction zone as will be presently described in order to maintain the maximum amount of concurrent travel. During the hydroforming reaction, coke or carbonaceous material is deposited on the catalyst particles and this deposit of coke or carbonaceous material reduces the activity of the catalyst. To remove the carbonaceous material, the catalyst is regenerated which is usually done by burning with air or other oxygen-containing gas. The spent or coke-contaminated catalyst is withdrawn from the upper portion of the fluidized bed of catalyst 12 and directly from the dense bed 12 through an opening or port arranged in the withdrawal conduit 28 which is vertically arranged in the reactor 10 and which passes down through the fluidized bed of catalyst 12, grid 20 and through the bottom of reaction zone 10. The withdrawal conduit 28 comprises a stripping section and has its upper end extending above the level 14 of the dense bed of catalyst in the reaction zone 10. The upper end of the conduit 28 has openings 26 at one or more points along its length to permit flow of catalyst from the dense bed into the conduit.

The portion of the conduit 28 extending below the reaction zone 10 may be reduced in diameter or may be the same size as conduit 28 and forms a standpipe 30 for building up or developing additional pressure to overcome the pressure drop through the regeneration system. Standpipe 30 is provided with a control valve 32 at its lower end. The catalyst particles in the standpipe 30 may or may not be aerated by introducing gas from an external source. Because the system is under superatmospheric pressure which is much higher than the pressure drop through the regeneration system, the amount of pressure build-up by the standpipe is relatively small compared to the pressure in the process and consequently there is less compression of the gas separating the catalyst particles in the standpipe 30 as the solids move downward and if the passage of the catalyst down through the standpipe is fast enough, there is substantially no deaeration as gas is entrapped in the downflowing stream of solids and it is not necessary to supply aeration gas to the standpipe to maintain the particles in fluidized form. If necessary some additional aerating gas may be added at one or more spaced points in the standpipe 30.

Stripping gas such as steam, or an inert gas such as nitrogen, flue gas and the like is passed through line 34 into the bottom portion of conduit 28 to remove adsorbed or entrained hydrocarbons and hydrogen. The stripping gas passes upwardly through the conduit 28 countercurrent to the downflowing catalyst to remove or strip out the entrained or adsorbed material. The stripping gas and stripped out material passes out through the upper open end of conduit 28 into the dilute phase 16 of reaction zone 10 for removal therefrom with the vaporous reaction products.

The vaporous reaction products leaving fluidized bed 12 in the reaction zone 10 are passed overhead through line 38 after having passed through one or more dust separating means such as one or more cyclone separators to remove most of the entrained catalyst particles suspended in the gases and vapors leaving the top of the reaction zone 10. The vaporous reaction products still containing small amounts of catalyst particles are cooled to about 550° F. to 700° F. by passing through a cooler 42 in which the reaction products are preferably cooled by heat exchange with feed or recycle gas. During the hydroforming operation some polymer material is formed which is higher boiling than the desired gasoline and the major portion of this material is condensed in drum 44 where the reaction products are further cooled about 275° F. to 400° F. by circulating and cooling in exchanger 45 a slurry of catalyst particles in condensed oil. This slurry is withdrawn from drum 44 through line 44' by pump 44a then through exchanger 45 into drum 44. The portion of the slurry withdrawn from line 44' through line 46 is preferably filtered to recover the catalyst and may also be stripped to separate valuable gasoline fractions from the heavy polymer product.

Uncondensed vapors pass overhead from drum 44 through line 48 through condenser 49, where the reaction products are cooled to about 100° F., and pass finally to drum 52 which is a separator for removing hydroformate liquid comprising gasoline from process gas containing hydrogen. The hydroformate is withdrawn from drum 52 through 54 and may be processed in a stabilizing column to produce finished gasoline blending stock. In some cases it may be necessary to further process this hydroformate by rerunning in another distillation step. If this is done the bottoms from drum 44 having been filtered to remove catalyst may be combined with the hydroformate from drum 52 and also stabilized and returned with this material.

The separated gas passes overhead through line 56 and as it contains about 50–70% hydrogen it is a valuable gas for the process and is recycled through line 56 and heater 58 to line 22 for return to the reaction zone 10. At the beginning of the operation, an extraneous gas must be used but after the process is started recycle gas is available and it is used as the circulating gas in the hydroforming process. The recycle gas passing through line 56 in passing through line 24 contacts hot regenerated catalyst and transfers it to the reaction zone 10 as above described. Excess process gas may be withdrawn from the system through line 62.

Returning now to the spent or contaminated catalyst in the standpipe 30, the catalyst passing through control valve 32 is passed into line 64 where it is picked up with air or other carrier gas introduced through line 66 and the resulting suspension of spent catalyst in gas is passed through line 64 into the bottom of regeneration zone 70, below the perforated grid member 72 which functions to evenly distribute the catalyst particles and gas across the area of the regeneration zone 70. Preferably only about 15–40% of the total air necessary for regeneration is passed through line 64 because if all the air were added in line 64 there would be danger of overheating the catalyst because of the rapid burning of the coke since the system is under superatmospheric pressure and the catalyst is more easily regenerated than a cracking catalyst. The rest of the air or 85–60% of the total air is passed through line 74 into regeneration zone 70 below grid member 72. As an alternative method, inert gas such as flue gas, nitrogen or the like may be used as a carrier gas introduced through line 66 for carrying the spent catalyst to the regenerator zone 70 and in this case all of the air is passed through line 74 into the regeneration zone 70.

In the regeneration zone the catalyst is maintained as a dense fluidized turbulent bed 75 having a level indicated generally at 76, superimposed by a dilute phase 77 which comprises a dilute suspension of catalyst particles entrained in the upflowing gases in the regeneration zone 70. The superficial velocity of the air or other gas passing up through the regeneration zone is in the range of between 0.3 to 1.5 feet per second depending on the pressure, preferably below 1.0 foot per second at a regeneration pressure of about 200–250 lbs. per sq. in., with the lower velocities being used at higher pressures. The regeneration zone is maintained at a temperature between about 1050° and 1200° F., preferably about 1150° F. The pressure on the regeneration zone is about the same as that in the reaction zone, namely, about 100–500 lbs. per square inch gage, preferably about 200 lbs. per square inch gage.

The amount of hydrogen-containing gas recycled to the reaction zone 10 to line 24 is in the range between about 1000 and 4000 cubic feet per barrel of feed, preferably, about 2500 cubic feet per barrel of naphtha feed.

The regenerated catalyst is withdrawn through one or more ports in conduit 82 which is similar to conduit 28 in the reaction zone and which functions to strip the catalyst in the stripping conduit 82 by means of stripping gas introduced through line 84. The stripping gas may be any inert gas such as flue gas, hydrogen, gaseous hydrocarbons or the like.

The method and apparatus for controlling the temperatures of the catalyst undergoing regeneration in the regeneration zone 70 will now be described in connection with Fig. 2 which is an enlarged showing of the regeneration zone and associated parts.

The lower portion of conduit 82 is provided with a standpipe 83 which is longer than standpipe 30 associated with the reaction zone 10 but functions in substantially the same manner. Aeration gas from an external source may or may not be introduced into the standpipe according to the conditions of operation. Conduit 82 is provided with stripping gas introduced into the lower portion thereof through line 84. The stripping gas passes upwardly through conduit 82 to strip out entrained and adsorbed materials. The lower end of the standpipe 83 is provided with a valve 85 for controlling the rate of withdrawal of hot regenerated catalyst from the standpipe.

The method and apparatus for controlling regeneration temperature will now be described in connection with Fig. 2. In the above described process, heat is produced by the burning of the carbonaceous deposit on the catalyst particles and the amount of heat so produced is in excess of that supplied to reaction zone 10 by the circulated catalyst and it is therefore necessary to remove some of the heat from the regeneration zone 70 by other means. In the present case heat is removed from the regeneration zone by providing spiral heat exchange coils or other heat exchange elements in the regeneration zone through which water is circulated to produce steam at a pressure of about 200 lbs. per square inch gage which is substantially the same as the pressure in the regeneration zone 70 so that in the event of a leak or a broken pipe in the heat exchange coils there would be no danger of an explosion due to the evolution of large volumes of steam.

A steam disengaging drum 92 is provided into which water is introduced through line 94 to maintain liquid water 96 therein. Steam produced in the process is taken overhead from drum 92 through line 98 at about 200 lbs. per square inch pressure. Water is withdrawn from drum 92 through line 102 and is preferably pumped through line 104 by pump 106. The pump is not an essential element in this system as other systems may be used such as a thermo-siphon system. From line 104 the water passes to header 108 which communicates with a plurality of lines 110 with each line leading to a spiral coil heat exchange element or other heat exchange element within the regeneration zone 70. Each heat exchange element is preferably a spiral pancake coil with the turns of the coil sufficiently spaced to permit the upward passage of gases and solids without causing undesirable high gas velocities in vessel 70. However, other forms or shapes of heat exchange elements may be used.

While the heat exchange coils are shown as arranged horizontally in parallel relation one above the other, some of the upper coils may be arranged at an angle or may be inclined so that as the level of the fluidized catalyst rises in the regeneration zone it will contact only a portion of one or more of the inclined heat exchange coils. The lower heat exchange coils 112 are spaced relatively closely together and are usually submerged in the fluidized bed 75 to remove a substantially fixed amount of heat which is in excess of that needed to supply some of the heat in the reaction zone 10 by the hot regenerated catalyst.

The upper spiral coils 114, 116, 118 and 120 are spaced further apart in parallel relation within the regeneration zone 70 and as shown in the drawing the lowermost coil 114 is submerged in the dense fluidized bed 75, whereas the remaining coils in the group, namely, 116, 118 and 120 are above the level 76 of the dense fluidized bed 75 and are contacted by hot regeneration gases leaving bed 75 and which contain only a small amount of entrained catalyst as a dilute suspension. The density of the fluidized bed in regeneration zone 70 is about 25 to 30 lbs. per cubic foot when using molybdenum oxide on alumina as a catalyst while the density of the dilute suspension in dilute phase 77 is only about 0.001 lbs./cu. ft. to 0.1 lbs./cu. ft. It is known that the coefficient of heat transfer of a dense fluidized bed is much higher than a dilute suspension of solids in gases containing only a small amount of suspended solids when contacting a heat exchange element so that practically all of the heat is removed by the coils 112 and 114 submerged in the dense fluidized bed 75. While a certain number of heat exchange coils 112 and upper coils 114, 116, 118 and 120 have been shown, it is to be understood that the invention is not restricted thereto and more or fewer coils may be used.

The upper coils 114 to 120 are spaced further apart than the lower coils 112 to permit more accurate control of heat removal when the level of the dense fluidized bed is changed because the level may surge slightly during normal operation and the effective level may, therefore, extend over a small distance.

Lines 124 connect the outlet of each of the spiral heat exchange coils to an outlet header 126 which conducts steam and water into line 128 and thence to drum 92. In carrying out this invention it is necessary that all of the spiral coils are wet tubes which means that their interior surface should be covered with a film of water to avoid dry sections of the tubes which would become overheated. If this occurred, prohibitive temperature stresses would be set up in the tubes because of the difference in temperature between the wet and dry sections and the tube could rupture. It is, therefore, necessary that in the heat exchange system sufficient water is circulated through the spiral coils to have water and steam present in the coils and leaving the outlets of each of the spiral coils.

In the arrangement of heat exchange coils above given, about 60–75% of the coil surfaces are closely spaced in the lower portion of the bed 75 to remove a fixed amount of heat at all times. The control feature of this invention lies in the great difference in heat transfer between tubes or coils covered by the dense fluidized solids bed and the other tubes or coils exposed to gases in the dilute phase or dilute suspensions of solids in gases.

In order to distribute the water evenly to the spiral coils, an orifice or other suitable means (not shown) is preferably provided for each line 110 where it is connected with the inlet to each of the coils 112, 114, 116, 118 and 120.

With normal operation the level 76 of the dense fluidized bed 75 in the regeneration zone 70 will be as shown in the drawing and water will be passed through each line 110 and supplied to each of the spiral heat exchange coils and water and steam will pass through lines 124 to the outlet header 126 and steam and water will be introduced into the drum 92 by means of line 128. A control mechanism is provided to maintain normal operation and to take care of any variations in the normal operation. Instead of using an automatic control means, the system may, of course, be operated manually. When using an automatic mechanism a temperature responsive device 132 is provided in the dense bed 75 and is connected with a level control device generally indicated at 134. Control device 134 is connected with valve 85 on standpipe 83 of the regeneration zone for controlling the rate of withdrawal of catalyst from the regeneration zone. Under normal operation the level 76 will usually be substantially constant and the control mechanism will remain substantially constant.

Using a regenerator 7.5 feet in diameter and 25 feet high and containing about 9 tons of hydroforming alumina-molybdenum oxide catalyst and in order to remove 140 B. t. u./lb. of naphtha feed from regenerator, it is necessary to use 12 steam coils of 2 inches I. D. each 72 feet long. The lower coils 112 are spaced about 6 inches apart, whereas the upper coils 114, 116, 118 and 120 are spaced about 12 to 18 inches apart. A total of about 400 G. P. M. of water is pumped through the coils and about 22,000 lbs./hr. of 200 lbs./sq. in. gage saturated steam are generated.

The density of the fluidized bed in reactor 10 is about the same as that in the regenerator 70. The density of the catalyst material in standpipes 30 and 83 is about 44 lbs. per cubic foot but may be between about 38 to 44 lbs. per cubic foot when using molybdenum oxide-alumina catalyst.

Assuming that for some reason more coke or carbonaceous material is laid down on the catalyst in the reaction zone, as for example, if a different feed stock has been added to the regular feed stock and such different feed stock produces more carbon than the regular feed stock, then more carbon will be introduced into the regenerator and burned and more heat will be produced. This additional heat cannot be used in the reaction zone to supply some of the heat of reaction because the heat requirements of the reaction zone have been taken care of for normal operation. In other words, the heat which is supplied to the reaction zone by hot regenerated catalyst is kept constant because it is desired to maintain the catalyst circulation rate between the reactor and regenerator substantially constant.

Therefore, with more carbonaceous material on the catalyst, more heat will have to be removed from the regenerator. This is taken care of by the temperature responsive device 132 and its associated parts. As more carbon is burned in the regeneration zone, the temperature of the dense fluidized bed 75 goes up and the temperature responsive device 132 actuates control device 134 which in turn actuates valve 85 toward closed position to cut down on the valve opening so that less catalyst is withdrawn from standpipe 83 through valve 85. This results in the level 76 of the dense fluidized bed 75 rising and as the level rises the fluidized bed contacts the next higher heat exchange coil 116 and more heat is taken out of the dense fluidized bed or the regeneration zone through coil 116 than when only the dilute suspension of catalyst in gas was contacting the exterior of the heat exchange coil 116. If it is necessary to remove a still larger amount of heat, the level 76 of the dense fluidized bed will be raised to a higher level to contact additional heat exchange coils such as 118 and/or 120. When normal operation is resumed the level of the fluidized bed 75 will return to the level indicated in the drawing.

If for some reason less carbonaceous material is deposited on the catalyst than in normal operation, then the control mechanism will operate to lower the level 76 of the dense fluid bed 75 in the regeneration zone below heat exchange coil 114 and less heat will be removed from the regeneration zone 70 thereby maintaining the regenerated catalyst at the desired temperature. Because of the large catalyst holdup in the reaction zone and the small holdup of catalyst in the regeneration zone, the reactor can easily take the surges caused by changing the level 76 of the catalyst undergoing regeneration with negligible effect on the holdup of catalyst in the reaction zone.

While one form of apparatus has been shown and described and particular conditions of operation have been given, it is to be expressly understood that the invention is not limited thereto and various changes and modifications may be made without departing from the spirit of the invention.

What is claimed is:

1. In a process wherein catalyst is circulated between a reactor and a regenerator and a dense fluidized bed of catalyst is maintained in said regenerator from which a certain amount of heat is removed by contact with indirect heat exchange surfaces, the improvement which comprises changing the level of the dense fluidized bed in said regenerator to contact varying amounts of indirect heat exchange surfaces to change the amount of heat withdrawn from the dense fluidized bed in said regenerator.

2. In a process wherein finely divided catalyst is circulated between a reactor and a regenerator and a dense fluidized bed of catalyst is maintained in said regenerator by upward passage of regenerating gas of a selected velocity which also forms a dilute phase above the fluidized bed, the dilute phase comprising a dilute suspension of catalyst in gas, the improvement which comprises removing a substantailly fixed amount of heat from said regenerator by having indirect heat exchange surfaces submerged in said fluidized bed therein and removing an additional amount of heat from the regenerator by having indirect heat exchange surfaces arranged with part of the said surfaces submerged in the dense fluidized bed and the remainder of said surfaces arranged in the dilute phase within the regenerator and varying the amount of heat withdrawn by varying the dense bed level in the regenerator, thereby varying the ratio of heat exchange surface area in contact with dense fluidized bed to heat exchange surface area in contact with the dilute phase.

3. A process according to claim 2 wherein a stream of heat exchange fluid is subdivided into a plurality of streams some of which are passed as separate streams in contact with the interior surfaces of elements whose outer surfaces constitute said indirect heat exchange surfaces submerged in said dense fluidized bed and the rest of the streams are passed as separate streams in contact with the interior surfaces of elements whose outer surfaces constitute said indirect heat exchange surfaces in the dilute phase and after the heat exchange step the streams are combined.

4. A process according to claim 3 wherein the heat exchange fluid is water and steam is produced and sufficient water is circulated through said elements to maintain the interior surfaces of said elements wet.

5. An apparatus of the character described including a regenerator having an inlet for solids and regenerating gas and outlet means for regeneration gas, a plurality of separate horizontally arranged heat exchange tubes one above the other in the lower portion of said regenerator and in relatively close relation, other separate heat exchange tubes arranged at a higher level in said regenerator and spaced farther apart than said first-mentioned heat exchange tubes, means for passing separate streams of fluid through said heat exchange tubes and means for combining the streams of fluid after they have passed through said heat exchange tubes as separate streams, an outlet conduit for the withdrawal of regenerated catalyst particles extending from above the uppermost heat exchange tubes downwardly through the bottom of the regenerator and connected at its lower end with an elongated, vertical conduit forming a standpipe, means near the lower end of said conduit for controlling the withdrawal of regenerated catalyst from the regenerator and at least one opening in said outlet conduit within the regenerator for the discharge of catalyst from the regenerator into said outlet conduit.

References Cited in the file of this patent

UNITED STATES PATENTS

| | | |
|---|---|---|
| 2,112,733 | Burnham | Mar. 29, 1938 |
| 2,412,025 | Zimmerman | Dec. 3, 1946 |
| 2,431,630 | Arveson | Nov. 25, 1947 |
| 2,446,925 | Hemminger | Aug. 10, 1948 |
| 2,458,433 | Simpson | Jan. 4, 1949 |
| 2,458,435 | Simpson | Jan. 4, 1949 |
| 2,462,861 | Gunness | Mar. 1, 1949 |
| 2,488,406 | Hirsch | Nov. 15, 1949 |
| 2,493,526 | Campbell et al. | Jan. 3, 1950 |
| 2,515,373 | Keith et al. | July 18, 1950 |
| 2,548,295 | Fahnestock | Apr. 10, 1951 |